United States Patent [19]

Kitrell

[11] 4,325,318

[45] Apr. 20, 1982

[54] FOLDING DISABLED VEHICLE WARNING SYMBOL

[76] Inventor: John V. Kitrell, 4639 Holdrege, Lincoln, Nebr. 68503

[21] Appl. No.: 133,978

[22] Filed: Mar. 26, 1980

[51] Int. Cl.³ .............................................. E01F 9/10
[52] U.S. Cl. ............................... 116/28 R; 116/63 T; 248/293
[58] Field of Search ............ 116/63 T, 28 R; 40/588, 40/589, 590, 591, 592, 606, 612, 610; 248/293

[56] References Cited

U.S. PATENT DOCUMENTS

| | | | |
|---|---|---|---|
| 1,559,999 | 11/1925 | Shipman | 40/610 |
| 2,142,830 | 1/1939 | Wendell | 248/293 |
| 3,703,152 | 2/1972 | Morton | 116/63 T |
| 3,762,360 | 10/1973 | Hawes | 116/28 R |

*Primary Examiner*—Kyle L. Howell
*Assistant Examiner*—Denis E. Corr

*Attorney, Agent, or Firm*—Zarley, McKee, Thomte, Voorhees & Sease

[57] ABSTRACT

A folding disabled vehicle warning symbol or sign is described which is adapted to be mounted on the side of a vehicle such as a truck or the like. The sign comprises a vertically disposed housing which is mounted on the side of the truck and which has spaced-apart front and back walls, upper and lower ends, and an open outer end. A plurality of elongated flat sign segments are pivotally secured together and are pivotally secured to the housing in a manner so that the segments may be pivotally moved from a superposed stored position within the housing to an operative warning position outwardly of the housing. The pivotal sign segments define a triangular disabled vehicle warning symbol when in the warning position. The front and rear surfaces of the sign segments have light reflective material thereon.

8 Claims, 11 Drawing Figures

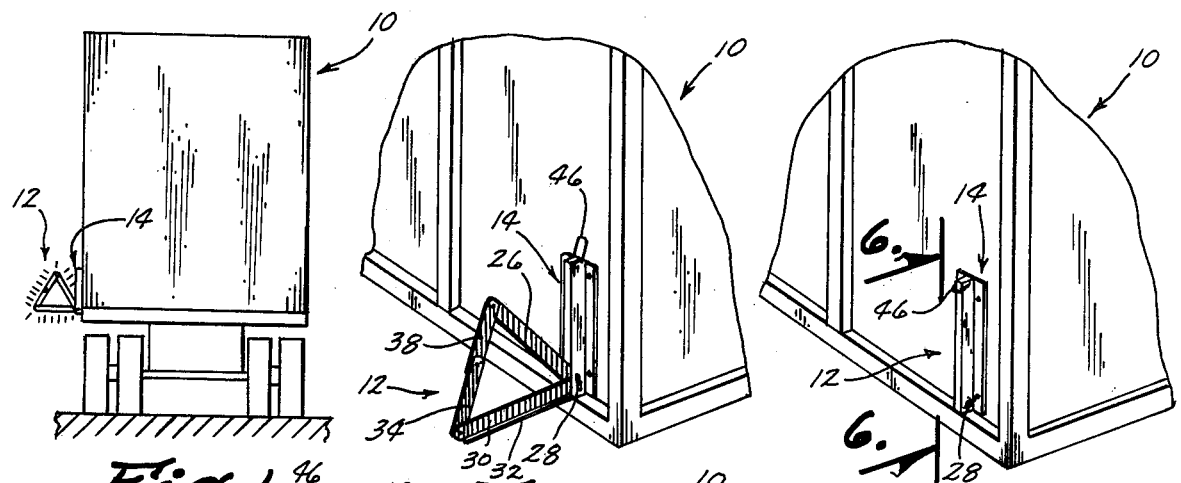
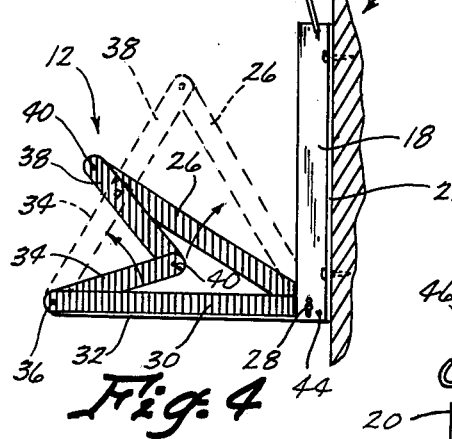
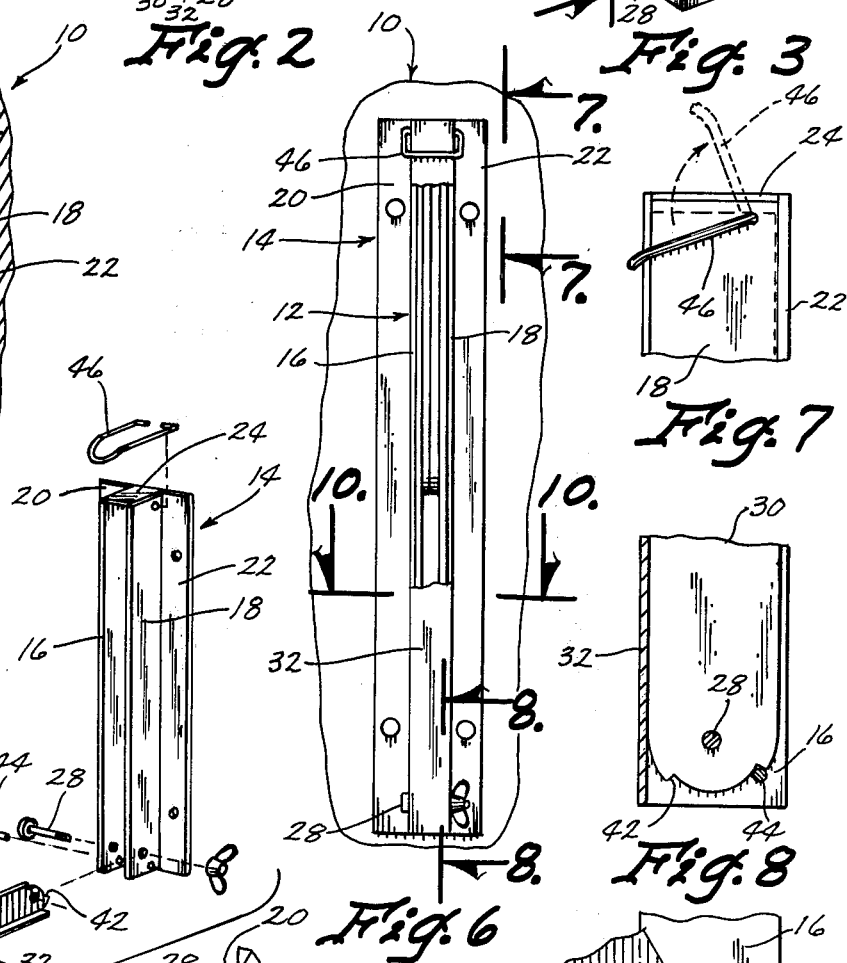
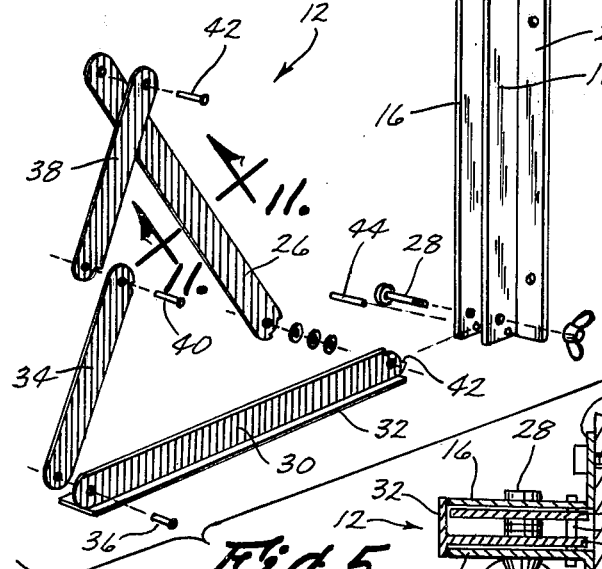
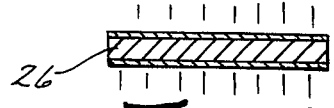
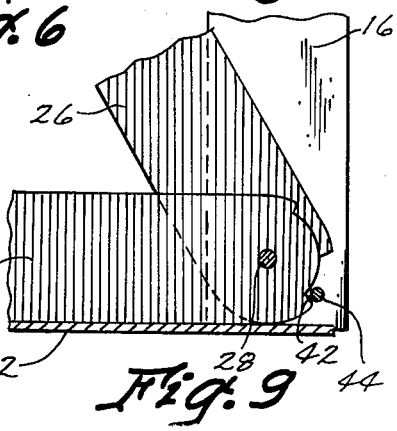

FOLDING DISABLED VEHICLE WARNING SYMBOL

BACKGROUND OF THE INVENTION

This invention relates to a disabled vehicle warning sign or symbol and more particularly to a disabled vehicle warning sign which is mounted on the side of a vehicle such as a truck or the like.

When vehicles such as trucks or the like become disabled on the highway, the operator of the vehicle normally places triangular shaped disabled vehicle warning signs at least rearwardly of the vehicle to warn other motorists that a disabled vehicle is being approached. A problem associated with the positioning of the disabled vehicle warning signs is that the vehicle operator must position the signs rearwardly of the vehicle and the positioning of the signs does require a certain amount of time. It is quite possible that an approaching motorist could strike the disabled vehicle prior to the operator being able to place the warning signs in position.

Therefore, it is a principal object of this invention to provide a folding disabled vehicle warning sign which is mounted on the side of the vehicle.

A still further object of the invention is to provide a folding disabled vehicle warning sign which may be quickly moved into its warning position.

A still further object of the invention is to provide a folding disabled vehicle warning sign for mounting on the side of a vehicle including means to prevent dirt or the like from coming into contact with the sign during the time that it is in its stored position.

A still further object of the invention is to provide a folding disabled vehicle warning sign which may be quickly and easily placed in its warning position.

These and other objects will be apparent to those skilled in the art.

BRIEF DESCRIPTION OF THE DRAWINGS

FIG. 1 is a rear view of a truck having the sign of this invention mounted thereon:

FIG. 2 is a rear perspective view of the sign in the warning position:

FIG. 3 is a rear perspective view illustrating the sign in the stored position:

FIG. 4 is a rear view of the sign illustrating the sign being moved to its operative position:

FIG. 5 is an exploded perspective view of the sign:

FIG. 6 is a side view of the sign with portions thereof cut away to more fully illustrate the invention:

FIG. 7 is an enlarged sectional view seen on lines 7—7 of FIG. 6:

FIG. 8 is an enlarged sectional view seen on lines 8—8 of FIG. 6:

FIG. 9 is a view similar to FIG. 8:

FIG. 10 is an enlarged sectional view seen on lines 10—10 of FIG. 6; and

FIG. 11 is a sectional view seen on lines 11—11 of FIG. 5.

SUMMARY OF THE INVENTION

A folding disabled vehicle warning sign is disclosed and which includes a vertically disposed housing which is mounted on the sidewall of a truck or the like. A plurality of sign segments are pivotally secured together and to the housing and may be pivotally moved from a stored position within the housing to a warning position outwardly of the housing. The sign segments define a triangular disabled vehicle warning symbol when in the warning position.

DESCRIPTION OF THE PREFERRED EMBODIMENT

Referring to the drawings, the numeral 10 designates a vehicle such as a truck or the like while the numeral 12 refers to the apparatus of this invention. Sign 12 comprises a housing 14 including front wall 16 and back wall 18. Mounting flange 20 extends forwardly from the inner end of front wall 16 while mounting flange 22 extends rearwardly from the inner end of back wall 18. Flanges 20 and 22 are secured to the sidewall of the truck by means of screws or the like in conventional fashion.

The upper end of the housing 14 is closed at 24 but it can be seen that the outer end of the housing is open. The numeral 26 refers to an elongated flat sign segment having one end thereof pivotally secured to walls 16 and 18 by means of pivot bolt 28. Sign segment 30 also has one end pivotally secured to the pivot bolt 28 as illustrated in the drawings. Segment 30 is provided with a flange 32 for a purpose to be described in more detail hereinafter. Sign segment 34 is pivotally connected to segment 30 at 36. Sign segment 38 is pivotally connected to segment 34 at 40. Sign segment 38 is pivotally connected to sign segment 26 at 42. As illustrated in the drawings, segments 26 and 30 have substantially equal lengths while the combined lengths of segments 34 and 38 are substantially equal to the length of each of the segments 26 and 30. As best seen in FIG. 3, the lower or inner end of segment 30 is provided with an indexing notch or shoulder 42 which is adapted to engage the index stop 44 to limit the outward movement of the sign segments. The numeral 46 refers to a spring clip or retainer which is pivotally secured to the housing and which is adapted to engage the upper end of segment 30 when the segments are in their stored position to maintain the segments in the stored position.

In use, the sign of this invention is preferably secured to the lower rearward end of the sidewall at the left side of the truck. The sign is secured to the wall of the truck by means of the screws extending through the mounting flanges 20 and 22. The segments are normally positioned within the housing and are stored in a superposed condition. When the segments are in their stored position, flange 32 on segment 30 engages the outer ends of the walls 16 and 18 of housing 14 to seal the interior of the housing to prevent mud, water, debris, etc. from entering the housing. Spring clip 46 engages the upper end of the segment 30 to maintain the segments within the housing in their stored position until the use of the sign is required.

If the vehicle should become disabled, the operator simply moves to the rear of the vehicle and lifts the spring clip 46 from its engagement with the segment 30. The driver then grasps the flange 32 and pulls or pivots the segment 30 outwardly and downwardly with respect to the housing. The pivotal movement of the segment 30 causes the other sign segments to also pivotally move outwardly from the housing. The pivotal movement of the segments is continued until shoulder 42 engages index stop 44 which will position segment 30 in a substantially horizontal position. Segments 30 and 34 are then pivotally moved so as to form a straight line which thereby positions the various sign segments in the triangular disabled warning vehicle configuration. Reflective material is provided on both the forward and rearward surfaces of the sign segments so that the segments will be highly visible.

Thus it can be seen that the warning sign of this invention may be quickly and easily moved from a stored position to a warning position so that approaching motorist are given advance notice that a disabled vehicle is being approached. The warning sign of this invention is not only quick and easy to use but includes means for quickly and easily mounting the same on the vehicle. The apparatus of this invention also includes means for preventing foreign material such as mud or the like from coming into contact with the stored sign segments to insure that the segments will be clean when they are pivotally moved into the warning configuration.

Thus it can be seen that the invention accomplishes at least all of its stated objectives.

I claim:

1. A folding disabled vehicle warning sign for attachment to a vehicle, comprising,
   an elongated rectangular housing having upper and lower ends, an inner end and an open outer end, spaced-apart front and back walls, said housing including mounting means for mounting said housing on the vehicle in a substantially vertically disposed position,
   a first elongated flat sign segment pivotally secured at one of its ends to said housing adjacent the lower end thereof,
   a second elongated flat sign segment pivotally secured at one of its ends to the said one end of said first sign segment,
   a third elongated flat sign segment pivotally secured at one of its ends to the other end of said second sign segment,
   a fourth elongated flat sign segment pivotally secured at one of its ends to the other end of said third sign segment and pivotally secured at its other end to the other end of said first sign segment,
   said sign segments being pivotally movable from a superposed stored position within said housing to a warning position outwardly of said housing, said sign segments, when in the said warning position, defining a triangular disabled vehicle warning symbol,
   said second sign segment including a flange means thereon which closes the open outer end of said housing when said segments are in their stored position within said housing.

2. The apparatus of claim 1 wherein said first and second sign segments have substantially equal lengths and wherein the length of each of said third and fourth sign segments is approximately one-half the length of said first sign segment.

3. The apparatus of claim 1 wherein said mounting means comprises a flange extending forwardly from the inner end of said front wall and a second flange extending rearwardly from the inner end of said back wall.

4. The apparatus of claim 1 wherein said second sign segment is substantially horizontally disposed when said segments are in their warning position.

5. The apparatus of claim 4 wherein means is provided to maintain said second sign segment in its horizontal position.

6. The apparatus of claim 1 wherein means is provided to selectively maintain said segments in the stored position.

7. The apparatus of claim 1 wherein said sign segments have rearward and forward surfaces and wherein reflective material is provided on said rearward and forward surfaces.

8. A folding disabled vehicle warning sign for attachment to a vehicle, comprising,
   an elongated rectangular housing attached to the vehicle,
   a first elongated sign segment operatively secured to said housing and being movable from a position within said housing to a position outwardly of said housing,
   a second elongated sign segment pivotally secured at one of its ends to said first sign segment adjacent one end thereof,
   a third elongated sign segment pivotally secured at one of its ends to the other end of said second sign segment,
   a fourth elongated sign segment pivotally secured at one of its ends to the other end of said third sign segment and pivotally secured at its other end to the other end of said first sign segment,
   said second, third and fourth sign segments being movable with said first sign segment,
   said sign segments being movable from a superposed stored position within said housing to a warning position outwardly of said housing,
   said sign segments, when in the said warning position, defining a triangular disabled vehicle warning symbol,
   said housing having an open end to permit said sign segments to be moved from the stored position within said housing to said warning position, and
   means on said first sign segment to close said housing open end when said segments are in their stored position.

* * * * *